(12) United States Patent
Lohrmann et al.

(10) Patent No.: US 7,911,880 B2
(45) Date of Patent: Mar. 22, 2011

(54) ACOUSTIC DOPPLER DUAL CURRENT PROFILER SYSTEM AND METHOD

(75) Inventors: Atle Lohrmann, Oslo (NO); R. Lee Gordon, San Diego, CA (US); Sven Nylund, Molde (NO)

(73) Assignee: Nortek as, Rud (NO)

( * ) Notice: Subject to any disclaimer, the term of this patent is extended or adjusted under 35 U.S.C. 154(b) by 775 days.

(21) Appl. No.: 11/752,125

(22) Filed: May 22, 2007

(65) Prior Publication Data

US 2008/0289433 A1 Nov. 27, 2008

(51) Int. Cl.
*G01S 15/00* (2006.01)
*G01F 1/66* (2006.01)

(52) U.S. Cl. ............... 367/90; 73/170.13; 73/861.25

(58) Field of Classification Search ............ 367/87, 367/89, 90; 73/170.13, 861.25
See application file for complete search history.

(56) References Cited

U.S. PATENT DOCUMENTS

| | | | |
|---|---|---|---|
| 3,910,111 A | 10/1975 | Mott et al. | |
| 4,270,191 A * | 5/1981 | Peynaud | 367/91 |
| 5,033,030 A | 7/1991 | Goodman | |
| 5,208,775 A | 5/1993 | Lee | |
| 5,550,789 A | 8/1996 | Silverstein | |
| 5,615,173 A | 3/1997 | Brumley | |
| 6,052,334 A | 4/2000 | Brumley et al. | |
| 6,097,671 A | 8/2000 | Merewether | |
| 6,262,942 B1 | 7/2001 | Stanton | |
| 6,682,488 B2 | 1/2004 | Abend | |
| 6,714,482 B2 | 3/2004 | Rowe | |
| 6,726,628 B2 | 4/2004 | Vilkomerson | |
| 6,820,008 B1 | 11/2004 | van Smirren et al. | |
| 6,871,148 B2 | 3/2005 | Morgan et al. | |
| 6,931,945 B2 | 8/2005 | Takeda et al. | |
| 6,983,208 B2 | 1/2006 | Metcalf et al. | |
| 7,379,387 B2 * | 5/2008 | Strong et al. | 367/89 |
| 7,539,082 B2 * | 5/2009 | Vogt | 367/90 |
| 7,545,705 B2 * | 6/2009 | Brumley et al. | 367/90 |

FOREIGN PATENT DOCUMENTS

WO 0020893 4/2000

OTHER PUBLICATIONS

Munchow et al., "Performance and Calibration of an Acoustic Doppler Current Profiler Towed below the surface", Journal of Atmospheric and Oceanic Technology, vol. 2, Apr. 1995, p. 435-443.*
Wood, et al., Measurement of Deepwater Ocean Waves, IEEE Oceans 2005, vol. 1, pp. 166-171.
Pedersen et al., Wave Measurement From a Subsurface Platform, Waves 2005.

(Continued)

*Primary Examiner* — Ian J Lobo
(74) *Attorney, Agent, or Firm* — Stephen C. Beuerle; Procopio Cory Hargreaves & Savitch LLP

(57) ABSTRACT

An AD2CP includes at least one transducer assembly emitting sets of slanted directional acoustic beams and receiving the echoes; and electronics that processes the echoes into depth cells and computes velocity in each depth cell. The AD2CP is configured so that each beam set has a profiling catenation, at least two of which are different, and the AD2CP is configured so that the emitting, receiving and processing operate contemporaneously.

32 Claims, 6 Drawing Sheets

OTHER PUBLICATIONS

Chereskin, Southern Ocean Current Observations from the U.S. Antarctic Research Vessels, Retrieved from the Internet: http://tryfan.ucsd.edu/antarctic/ (printed Jul. 27, 2007).

Visbeck, Deep Velocity Profiling using Lowered Acoustic Doppler Current Profilers: Bottom Track and Inverse Solutions, J. Atmospheric and Oceanic Technology, 2002, vol. 19, No. 5, pp. 794-807.

Terray, et al., Measuring Waves and Currents with an Upward-Looking ADCP RD Instruments Report 1999.

Siegel, et al., Real-Time Directional Wave Measurements Sea Technology Magazine, Feb. 2006.

RD Instruments, Acoustic Doppler Current Profiler Principles of Operation, A Practical Primer 1996.

RD Instruments, Waves Primer: Wave Measurements and the RDI ADCP Waves Array Technique, 2004.

USGS Office of Surface Water Technical Memorandum No. 2002.02, Policy and Technical Guidance on Discharge Measurements using Acoustic Doppler Current Profilers, Dec. 7, 2001.

Mullison, Innovative Current Profiling Technology for Moored Applications Oceans 2006.

Nortek Aquadopp Profiler, Nortek AS Brochure, 2005.

Sontek ADP, SonTek Brochure, 2000.

Sontek PC ADP, SonTek Brochure, 2003.

Teledyne RDI Workhorse Sentinel, Teledyne RD Instruments Brochure, 2005.

Teledyne RDI Workhorse Waves Array, Teledyne RD Instruments Brochure, 2005.

Teledyne RDI Workhorse Nemo, Teledyne RD Instruments Brochure, 2005.

Nortek Continental, Nortek AS Brochure, 2004.

Nortek AWAC, Nortek AS Brochure, 2006.

Nortek Aquadopp, Nortek AS Brochure, 2004.

Purcell, M et al., "New Capabilities of the REMUS Autonomous Underwate Vehicle" Oceans 2000 MTS?IEEE Conference and Exhibitation, Sep. 11-14, 2000, Piscataway, NJ, vol. 1, Sep. 11, 2000, pp. 147-151.

Akkeb B et al., "REMUS: A Small, Low Cost AUV; System Description, Field Trials and Performance Results", Oceans 1997, MTS?IEEE Conference Proceedings, Halifax, NS, Canada, Oct. 6-9, 1997, New York, NY, vol. 2, Oct. 6, 1997, pp. 994-1000.

Quaresma et al., "Evidence of Sediment Resuspension by Nonlinear Internal Waves on the Wester Portuguese Mid-shelf", Marine Biology, Elsevier, Amsterdam, NL, vol. 246, No. 2-4, Dec. 7, 2007. pp. 123-143.

Terray E A et al., "Measuring Waves and Currents With an Upward-looking ADCP" proceedings of the IEEE 6th working conference on current mesurement, San Diego, CA, Mar. 11-13, 1999; pp. 66-71.

\* cited by examiner

ACOUSTIC DOPPLER DUAL CURRENT PROFILER SYSTEM AND METHOD

FIELD OF THE INVENTION

The present invention relates generally to instruments and methods for measuring the velocity of water in the ocean.

BACKGROUND OF THE INVENTION

Acoustic Doppler Current Profilers, or ADCPs, were first introduced and used by oceanographers in the late 1970s. ADCPs use acoustic beams to measure ocean current velocity over vertical profiles with ranges of a few meters to around 1000 m. They transmit sound, receive the echoes and process the echoes to detect changes in frequency associated with Doppler shifts produced by the relative velocity of the water and the ADCP. The result is a velocity profile, or velocity measurements in a series of depth cells forming a profile over depth. The ADCP either records the velocity profile data on an internal recorder or transmits the data to an external device or computer.

Starting in the 1970s, ADCPs initiated a revolutionary change for people who studied the ocean. A single ADCP could replace the velocity measurements of a string of current meters while producing data that was both better and easier to use. Current meters were spaced irregularly, they left gaps when they failed, and the drift of their internal clocks produced data that was difficult to synchronize. In contrast, ADCPs produced data with uniform and regular coverage, both over depth and in time. An ADCP's data at each depth are perfectly synchronized with the data from all the other depths. As ADCPs replaced strings of moored current meters, they also made it possible to survey currents from moving ships. Today, most of the current data collected in the ocean is collected by some variation of an ADCP.

ADCPs transmit sound into the ocean through acoustic transducers, which serve as well to receive the echoes returning to the ADCP. Sound is well suited for making remote measurements of current velocity in the ocean because sound propagates over much larger distances in the ocean than light or other electromagnetic radiation. ADCPs use electronics to create the acoustic signals transmitted by the transducers, process the received echo signals, and compute velocity.

Transducers are carefully designed to produce narrow, directional acoustic beams for which the beam directions, relative to the ADCP are known precisely. Each beam measures a single component of velocity, the velocity component parallel to the beam. The beam must be highly directional in order to accurately measure its component. Since a velocity vector has multiple components, velocity measurement requires multiple beams. Therefore, commercial ADCPs use a set of beams, all pointing in different directions to measure velocity.

Most ADCPs use individual piston transducers, each emitting a corresponding acoustic beam. They are called piston transducers because they are made from cylindrical disks of piezoelectric ceramics, which vibrate in "piston mode" to produce a single beam of sound along the axis of the disk. The surface of a piston transducer that faces the water also faces in the direction the beam points.

Piston transducers are normally combined by the manufacturer into transducer assemblies, which hold several transducers, each precisely aligned relative to one another. Precise alignment is necessary for the computation of the velocity vector from the single components measured by the beams.

Some ADCPs use phased arrays, which are a different sort of transducer assembly. Phased arrays include a large number of small transducer elements, and complex electronics. They use complex signal processing involving time delays or phase lags to produce multiple beams from a single aperture. Phased arrays and piston transducer assemblies have strengths and weaknesses relative to each other in terms of the quality of the results they produce, but their velocity profiles are otherwise the same.

A transducer assembly built using piston transducers forms a set of beams using one transducer to form each beam. A single phased array transducer can also form a set of beams. The ADCP uses the velocity components measured with a set of beams to compute a velocity profile. Whereas each velocity component is the velocity parallel to a single beam, the computed velocity is a vector with both magnitude and direction.

Velocity measurement in the ocean depends on the fact that ocean currents usually are both horizontal and horizontally homogeneous. Currents vary rapidly with depth, but they vary slowly over horizontal displacements. With the use of a compass and tilt sensor, two beams are sufficient to measure the velocity as long as the vertical velocity is small (which normally is a reasonable assumption in the ocean). However, nearly all commercial ADCPs use beam sets having three or four slanted beams, which enables them to measure both horizontal and vertical components of the velocity. The use of more than two beams also improves the accuracy of the velocity measurements.

Measurement of horizontal velocity in vertical profiles requires that beams be slanted relative to vertical. Purely vertical beams can perform useful functions such as measuring the distance to the surface, but they do not provide information about the horizontal velocity. ADCP beam sets are characterized as having a characteristic slant angle, most often in the range 20-30 degrees relative to vertical. A beam with a 90-degree slant angle is slanted horizontally. The slant angle refers to the angle between the beam and vertical. Each beam in a beam set typically has its own direction component in the horizontal plane, but all of the beams in a typical beam set have the same slant angle. Therefore, beam sets normally have a single characteristic slant angle.

When beams are created by piston transducers, each transducer set produces a corresponding beam set. The beam sets are physically separated and occupy different space; they may also have different slant angles. Phased arrays can also produce multiple beam sets, which can differ from one another by the slant angle or by occupying different physical space.

Beams, beam sets and transducers can all face upwards or downwards depending on the slant angles. A beam that points above the ADCP is said to face upward. If all of the beams in a beam set point above the ADCP, then the entire beam set faces upward. A transducer assembly emitting these beams would also be said to face upward. The slant angle of an upward facing beam set has the opposite sign from the slant angle of a downward facing beam set even when the magnitude is the same. There is no general convention whether slant angles should be defined as positive upward and negative downward, or visa versa, but ADCPs nevertheless account for this angle in their processing.

Slanted beams produce a tension between the need to obtain data over a profile and the need to measure velocity accurately. A purely horizontal beam provides the most accurate measurement of horizontal velocities, and the velocity uncertainty increases as the beam becomes more vertical. While purely vertical beams provide no information about horizontal currents, they give the greatest possible vertical profiling range; the useful vertical range decreases as a beam becomes more horizontal. The typical 20-30 degree beam angles represent a compromise of these conflicting needs. It is worth noting that while the beam angle is fixed relative to the ADCP, the beams can all vary in angle relative to the earth. For example, an ADCP mounted on a mooring can tilt back and forth, which changes the beam angle relative to the earth as the ADCP moves about. However, as long as the tilting is not too large, the ADCP tilt has a relatively unimportant effect on the measurement quality and can be ignored.

Compromises associated with the beam angle provide one example of the many trade-offs involved in the design and use of ADCPs. Another compromise involves the acoustic frequency. The frequencies commonly used in ADCPs range from around 30 kHz up to around 2.5 MHz. Low frequency sound propagates further than high frequency sound, so the lowest frequencies are used for the greatest profiling ranges. On the other hand, higher frequency sound produces velocity measurements with lower velocity uncertainty, and it enables measurement with smaller depth cells.

Transducer assemblies can be built with transducers having different frequencies. In some circumstances, the data from beams having one frequency can be used to improve the profile results from the beams with the second frequency. If two frequencies are used for the sole purpose of measuring a single velocity profile, the beams of the two frequencies act like a single beam set. However, if the two frequencies produced independent velocity profiles, they clearly produce two independent beam sets.

ADCP users commonly swap an ADCP's transducer assembly to change the ADCP's beam set. Swapping the transducer allows the user to change the locations and/or angles of the individual beams, but not normally the frequency since the frequency is usually fixed by the electronics. ADCPs built using piston transducers traditionally produce a single beam set with each transducer assembly.

Another trade-off involves the acoustic power. An ADCP that uses higher power can measure velocity further from the ADCP, but it will then deplete its battery more quickly, therefore shortening the duration of the ADCP's deployment. There are limits to the acoustic power that a transducer can actually get into the water, and the limits vary with frequency.

Another trade-off involves the mode of operation, which the ADCP uses to collect data. Typical ADCPs are able to adjust a wide variety of parameters that affect how they collect data, each of which incurs trade-offs. Examples include the transmit pulse length, the depth cell size, the ping repetition rate, the time interval between which average measurements are made and other details of how the pulse is transmitted. All of these parameters could be made to be user adjustable, and all fall into the same category under the mode of operation.

The transmit pulse length and depth cell size are related and they are often set to the same values. Both are measured in terms of a duration (milliseconds). With scaling by the speed of sound in water, the duration can be expressed as a distance (meters) corresponding to the size of the depth cell. A velocity profile is a set of velocity measurements in a sequence of depth cells. Lengthening the transmit pulse enables the ADCP to get more energy into the water, which enables greater range, but at the expense of battery life. Longer transmit pulses reduce the velocity uncertainty, but also increase the size of depth cells.

In simple terms, the velocity profiling range is the product of the number of cells and the cell size (plus an offset near the transducer). In practice, the range is limited by a number of factors, the most important of which is the acoustic frequency. As the distance from the ADCP increases, the acoustic signal/noise ratio falls to the point where the velocity data becomes too noisy to use. ADCPs are able to compute and record velocity from beyond this range, but the data are not useful. Users can optimize data collection for long range, for example, by maximizing power, using long transmit pulses, long depth cells, and large blanking, but maximizing the profiling range can also impair the ability of the ADCP to measure velocity close to the ADCP.

ADCPs typically produce velocity measurements that are the average of many pings. The time between the pings and the number of pings per measurement determine the measurement interval. Each ping includes transmitting an acoustic pulse, receiving the echo and computing velocity in the depth cells from the echo. The velocity measurement obtained from a single ping is typically too noisy to use by itself, but the average of a number of these pings is less noisy and therefore more useful. It is worth noting that some pings actually can be divided into sub-pings in which a sequence of transmission pulses work together to produce a complete profile. For example, one sub-ping can provide a coarse measurement while the next sub-ping provides a fine measurement that is somehow constrained by the first sub-ping. In this way, a sequence of pulses produces a single velocity estimate, and this sequence of pulses can be considered to form a single ping. Another example is an ADCP's bottom-track pulses. Bottom track pulses provide an earth-reference velocity, which converts the current profile measurement from ADCP-referenced to earth-referenced. The bottom-track pulse improves the quality of the data in a current profile, but it does not change the profile's temporal, spatial or velocity scales.

In order to obtain a better velocity estimate, the ADCP can reduce its ping interval (within limits) to obtain more data in a given measurement interval. Increasing the number of pings averaged in a given interval makes the velocity measurement more accurate, but at the cost of depleting the battery quicker. Alternatively, an ADCP can average more pings by waiting longer before it computes the next average. In this way, increasing the measurement interval makes the result more accurate.

Another way in which ADCPs can change the mode of measurement is to vary the phase or amplitude of the transmit pulse while it is being transmitted. There are many methods available for implementing such variations, each with its corresponding means of processing. These methods also involve trade-offs including measurement uncertainty, depth cell size, measurement interval, and profiling range.

It is worth noting that some of the trade-offs involve parameters that can be adjusted within a given instrument, while other parameters are fixed. For example, most of today's ADCPs fix both the beam angles and the frequency (though some ADCPs with phased arrays could provide some control over the beam angle). Some ADCPs have fixed transmit power while others allow users to control the transmit power. Most ADCPs allow users to vary most of the other parameters discussed above.

The trade-offs discussed thus far are important because they affect the ability of the ADCP to measure specific ocean processes. People study a wide variety of ocean processes for a wide variety of purposes. Examples of ocean processes include ocean circulation currents like the Gulf Stream, coastal currents, internal waves, near-surface wind driven currents, Langmuir currents, currents in bottom boundary layers, turbulence, and the orbital velocities produced by surface waves. Each process has its own characteristic scales: typical velocities, typical time and length scales of variation. Scientists use the Navier-Stokes equations to model these processes, but the equation is too difficult to solve in general, so each process has its own particular simplifications and approximations that enable scientists to model and understand the process. Ocean processes that are observable to an ADCP include more than just ocean physics. Engineers often study physical processes with an eye toward learning about the forces that affect operations in the ocean or the survivability of ocean structures. Such engineers are concerned about the processes in which ocean current velocity affects offshore operations and structures.

Users decide which profiling parameters to use after considering the ocean process they plan to study. For example, an oceanographer observing the Gulf Stream will likely require a relatively long profiling range but would be satisfied with large depth cells and long intervals between measurements. A person studying the boundary layer under the Gulf Stream (i.e. the near-bottom flow that is affected by the friction of the bottom) will study a smaller profiling range, but will typically look for smaller depth cells and shorter measurement intervals. Engineers will adjust their measurements according to the structures they are working with. For example, an engineer placing a floating drilling rig in the Gulf Stream may not need to profile as deeply as one designing a production platform. On the other hand, the one concerned about the drill rig may need shorter intervals between his measurements.

A need exists for ADCPs that study multiple ocean processes, including the relationships among these processes. A further need exists to use a single instrument to study multiple processes in place of two or more instruments. The need also exists for a single instrument that can study multiple processes that occupy different nearby physical spaces.

Where people deploy two ADCPs nearby one another, there is a need for synchronizing the two data sets. If the data collected by two ADCPs could be coordinated into a single ADCP, this problem would be solved, but then there is a need to allow the two data sets to be optimized separately according to what the ADCPs are deployed to observe. For example, a scientist studying the Gulf Stream would observe the bottom boundary layer under the Gulf Stream with a different ADCP because the scales are so different, but because the two ADCPs' clocks drift relative to one another, he would struggle when trying to compare the two data sets.

Today's commercial ADCPs are designed so that each transducer beam, its corresponding signal path, and the processes that control the operations along each path are all identical. A single transmit circuit serves all of its channels. A single timing controller with parallel lines to each signal path controls all of them the same. The profiling parameters set by the ADCP user translate into complex and precise timing sequences that control how the ADCP works, and the design of an ADCP is simplified by applying the same timing to all of the ADCP's channels. This approach has generally worked well for both manufacturers and users because the simplifications reduce the cost of ADCPs, simplify their use and produce high quality results that users appreciate.

SUMMARY OF THE INVENTION

An objective of this invention is to overcome one or more problems described above, and provide a method and apparatus to enable contemporaneous observation of more than one ocean process from a single instrument. In the aspects of the invention described herein, because each oceanic physical process can have its own velocity profile, the name for this measuring instrument is an Acoustic Doppler Dual Current Profiler, or an AD2CP. An AD2CP observes multiple processes, each with its own scales, including time scales, length scales and/or velocity scales. The AD2CP optimizes data collection separately for each process it observes.

An ADCP is capable of implementing profiling catenations on a single beam set, but the AD2CP can have more than one independent profiling catenation in operation on different beam sets at one time. A profiling catenation collects and organizes the parameters that play a role in the quality and characteristics of an ADCP's velocity profile data. A profiling catenation is a chain of numbers that is an ordered series of these parameters. A profiling catenation includes all the parameters users can adjust that affect the measurement interval, depth cell size, profiling range, velocity uncertainty, and energy consumption.

A profiling catenation shares some of the mathematical properties of a vector. As one-dimensional arrays of values, both are subject to many of the same mathematical constructs, for example, those of multivariate calculus. Unlike vectors, profiling catenations have neither magnitude nor direction. Profiling catenations are primarily useful through functions that map them to scalar values such as the measurement interval, depth cell size, profiling range, velocity uncertainty, and energy consumption. Investigators can vary profiling catenations and, using their associated scalar mappings, they can minimize or maximize functions of these scalar results in order to obtain the best possible results from their ADCP observation.

Ocean phenomena differ from one another in their scales. For example, coastal currents cover most of the water column with little variation over depth, while currents in the boundary layer under them change rapidly over a few meters. The waves above the coastal currents are concentrated in the top few meters. Waves and coastal currents also differ vastly in terms of their time scales. Coastal currents vary with time scales of hours and days while waves vary with time scales of a few seconds. Velocity scales play a role too. Coastal currents with velocities of 1 m/s require less accurate velocity measurement than do internal waves with velocities of a few cm/s.

One aspect of the invention is an AD2CP that contemporaneously observes more than one different ocean process with beam sets having profiling catenations that are optimized specifically for each process. Each beam set has its own profiling catenation, and each profiling catenation can be optimized separately. The end result is that the AD2CP is able to capture the motions at the scales that characterize each process. Another advantage of an AD2CP is the ability to make measurements at the depth of the AD2CP using horizontal beams. The AD2CP's ability to use different profiling catenations for the vertically-profiling beams and the horizontal beams enable it to operate efficiently; it could use high power for the vertically-profiling beams, which require a long profiling range, and low power for the horizontal beams, which make their measurements closer to the AD2CP. As a result, the addition of the horizontal beams places little additional load on the AD2CP's battery packs.

Another aspect of the invention is an AD2CP that uses one beam set facing upwards and another beam set facing downward to double the profiling range of the AD2CP. Furthermore, in cases where velocity measurements in the region close to the AD2CP are important, in an implementation of this aspect of the invention, the AD2CP adds a third beam set facing horizontally to fill in data in the gap between the upward and downward beams. Such an AD2CP would replace two, or even three instruments with a single instrument having a single electronics that controls multiple beam sets, with everything integrated into a single package. The advantages go well beyond having a single package because the system would produce perfectly synchronized data, it would require fewer battery packs, and it would vastly simplify deployment. This is an example of an AD2CP that would add substantial value to a system intended to observe only a single, albeit large-vertical-scale, process.

Multiple profiling catenations operate together to produce contemporaneous observations, which are observations that cover the same time frame. An essential feature of contemporaneous observations of different phenomena is that the data preserves the temporal relationships of the different processes—the observations must be synchronized. The AD2CP produces multiple beam sets, implements multiple catenations, allows them all to operate contemporaneously, and provides synchronous data collection.

Contemporaneous observations are for practical purposes simultaneous, even when pings using different beam sets are not made at precisely the same time. AD2CPs can implement multiple catenations in which individual pings are simultaneous for the catenations, or pings can be interleaved, or individual profile averages can be interleaved, or the AD2CP can interleave entire blocks of recorded data from different profiling catenations—all of these are forms of contemporaneous data collection.

In one or more embodiments, the AD2CP observes by alternating pings from one beam to another, by alternating from one beam set to another, and/or collecting data from every beam simultaneously. While pinging alternately and pinging simultaneously each has its own advantages and drawbacks, the distinction is unimportant for contemporaneous observations of ocean processes. If an AD2CP is able to collect multiple pings over time scales that are short compared to the time scale of each process, then the distinction is irrelevant. When ocean processes have short time scales, for example surface waves, then properly accounting for the time lags among the different pings also produces the same results, whether the pings are sequential or simultaneous.

Another advantage of an AD2CP that implements multiple profiling catenations is that its beam sets are precisely aligned with one another. Precise alignment is an advantage compared to the use of two different instruments, which users must carefully align prior to deployment. While precise alignment of all the beams is an advantage in most cases, there are some cases where an AD2CP would be easier to deploy with two transducer assemblies that are free to move relative to each other. In this case, each transducer assembly could be equipped with its own compass to determine the alignment of the transducers.

In one aspect, the aforementioned advantages are implemented in an AD2CP comprising at least one transducer assembly. This assembly is adapted to emit sets of slanted directional acoustic beams and to receive the echoes. The AD2CP further includes electronics that processes the echoes to determine depth cells and to compute velocity in each depth cell. The AD2CP is configured so that each set of beams has a profiling catenation where two profiling catenations are different from each other. The AD2CP operates so that the emitting, receiving and processing all operate contemporaneously.

In one embodiment, the AD2CP comprises a first piston transducer assembly, which emits a first set of slanted directional acoustic beams and receiving the echoes and a second piston transducer assembly emitting a second set of slanted directional acoustic beams and receiving the echoes. In this embodiment, the two beam sets use different slant angles. The AD2CP further comprises a single electronics, which is integrated together into a single package with the first transducer assembly and the second transducer assembly. The electronics processes the echoes for both transducer assemblies into depth cells and computes velocity in each depth cell. The AD2CP is configured so that each set of beams has a profiling catenation where two profiling catenations are different from each other, and the AD2CP is configured so that the emitting, receiving and processing operate contemporaneously.

In one embodiment, an AD2CP comprises a first transducer assembly facing upward and a second transducer assembly facing downward. Each assembly emits a set of slanted directional acoustic beams and receives the echoes; the upward assembly emits upward beams and the downward assembly emits downward beams. The AD2CP further comprises electronics that processes the echoes into depth cells and compute velocity in each depth cell. Each beam set has its own profiling catenation, and two of the beam sets' profiling catenations are different from each other. The AD2CP is configured so that the emitting, receiving and processing operate contemporaneously.

In one embodiment, an AD2CP comprises a first transducer assembly and a second transducer assembly, each of which emits a set of slanted directional acoustic beams and receives the echoes. The second transducer's beams are slanted horizontally. The AD2CP further comprises electronics, which processes the echoes from the first transducer assembly's beams into depth cells, and computes the velocity in each depth cell. The electronics also processes the echoes from the horizontal beams to compute velocity. The AD2CP is configured so that the emitting, receiving and processing operate contemporaneously.

In another aspect, the aforementioned advantages are implemented using a method for measuring current velocities. The method comprises generating at least two sets of slanted directional acoustic beams and receiving the echoes and processing the echoes into depth cells and computing velocity for each depth cell. Each beam set has its own profiling catenation, and at least two of the profiling catenations are different. The generation, receiving and processing for the beam sets takes place contemporaneously.

DETAILED DESCRIPTION OF A PREFERRED EMBODIMENT

Figure 1A:
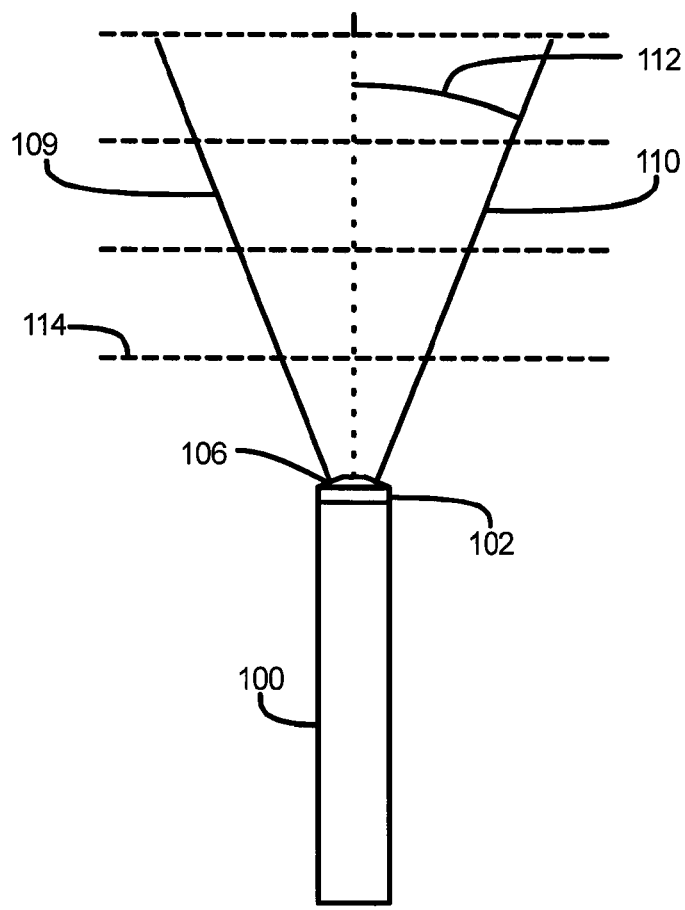
FIG. 1a is a schematic of a prior art ADCP.
Figure 1B:
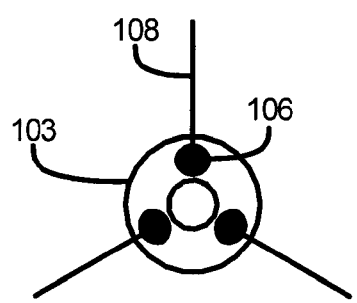
FIG. 1b is a top view of the ADCP of FIG. 1 and shows the face of a transducer assembly of the ADCP with three transducers shown.
Figure 1C:
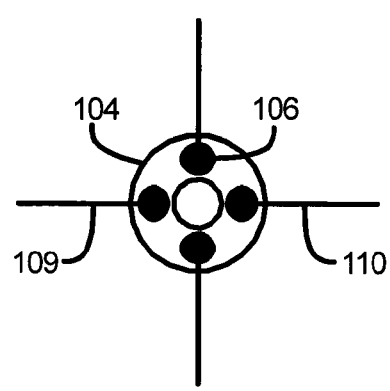
FIG. 1c is a top view, similar to FIG. 1b, of another prior art ADCP, and shows a transducer assembly 104 with four transducers 106.

With reference initially to FIGS. 1a-1c, before describing an Acoustic Doppler Dual Current Profiler ("AD2CP") in accordance with an embodiment of the present invention, some features of ADCPs of the prior art will first be described to assist the reader in understanding the invention.

With reference to FIG. 1a, an ADCP 100, shown in side view, has, at its top, a transducer assembly 102. This example illustrates an ADCP with its transducer assembly 102 facing upward, but the ADCP 100 could as easily be turned around to face downward. FIG. 1b shows the face of a transducer assembly 103 with three transducers 106, and FIG. 1c shows a transducer assembly 104 with four transducers 106. Each transducer 106 produces a corresponding beam 108, 109, and 110 of sound. The beam angle 112 (FIG. 1a) is the angle between the beam and vertical. This angle 112 is not the only angle required to define the direction of the beam, but it is the angle most commonly specified for an ADCP. Usually, though not always, the transducer beams are arrayed uniformly around the transducer, as shown in FIGS. 1b and 1c. The dashed line 114 defines the boundary between adjacent depth cells. The user can adjust the size and location of depth cells.

Beams 109 and 110 are shown in FIGS. 1a and 1c to illustrate a pair of opposing beams on the 4-beam transducer in both top view and side view. Even though FIG. 1a corresponds to the beam arrangement of a 4-beam transducer such as FIG. 1c, drawings like FIG. 1a are also intended to represent other reasonable beam arrangements, such as the 3-beam transducer shown in FIG. 1b.

Figure 1E:
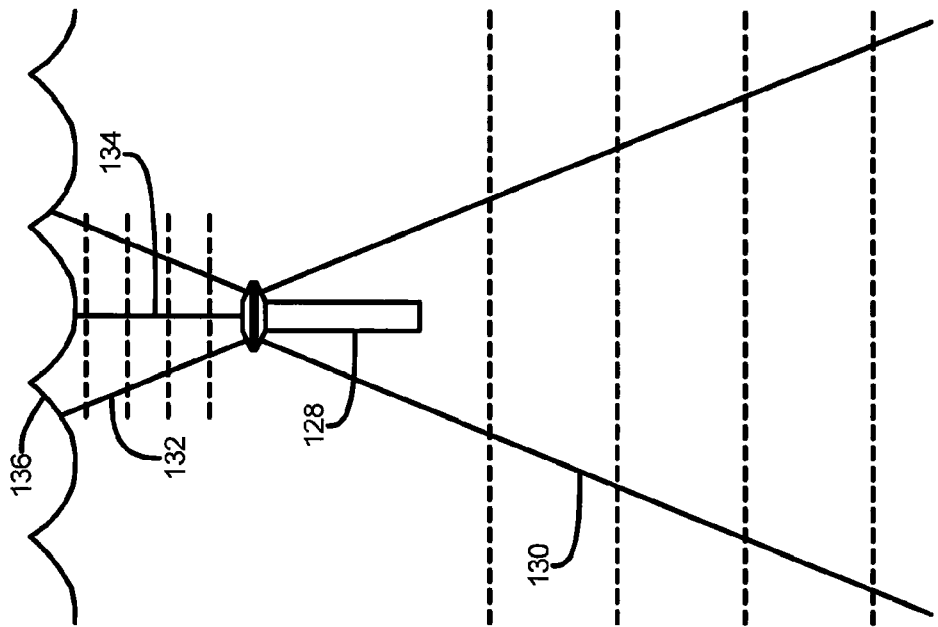
FIG. 1e is a schematic of an AD2CP constructed in accordance with another embodiment of the invention, and shows the AD2CP in a body of water.
Figure 1D:
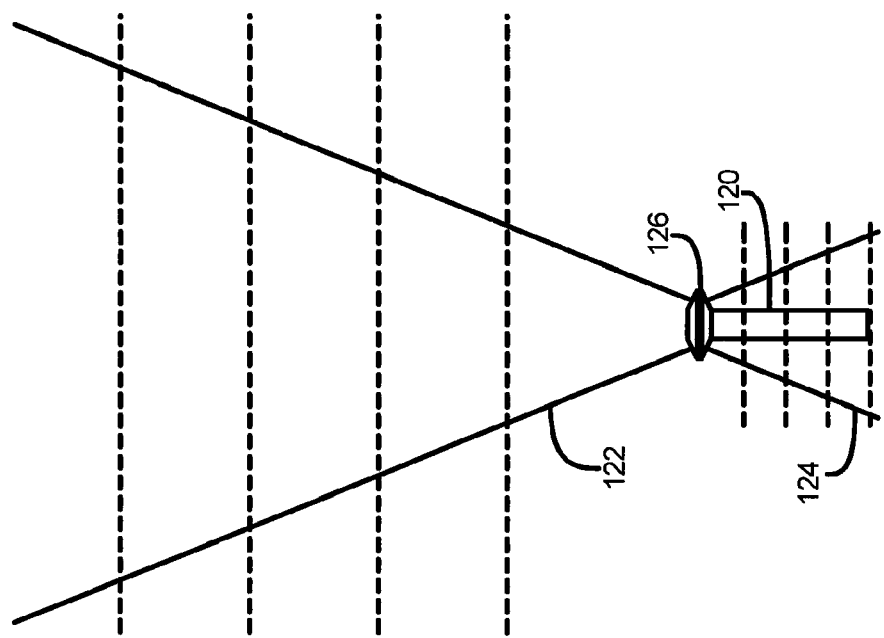
FIG. 1d is a schematic of an AD2CP constructed in accordance with an embodiment of the invention, and shows the AD2CP in a body of water.

With reference initially to FIG. 1d, an embodiment of an AD2CP 120 for use in the ocean (or other body of water) will now be described. The AD2CP 120 includes a single transducer assembly 126 producing a first set of beams 122 looking up and a second set of beams 124 looking down.

In an implementation of the AD2CP 120, the AD2CP is deployed above but close to the ocean bottom to study a coastal current (looking up) and flow in the bottom boundary layer (looking down). The AD2CP 120 works well with only a single frequency for both beam sets. For example, but not by way of limitation, with 470 kHz both looking up and down, the AD2CP reasonably profiles upward across a 100 m deep continental shelf and profiles downward over 10 m profile in the bottom boundary layer. For better detail in the bottom boundary layer, the AD2CP 120 could substitute, by way of example, 1000 kHz for the beams looking down. In another implementation of the AD2CP 120, the AD2CP 120 uses larger depth cells and longer measurement intervals for the profiles looking up compared with the profiles looking down. This illustration shows a single transducer assembly that holds two sets of beams, but in an alternative embodiment, the AD2CP 120 incorporates two transducer assemblies to perform the same work. For example, in such an embodiment, the AD2CP 120 has a first transducer assembly on the top of the AD2CP 120 and a second transducer assembly on the bottom of the AD2CP.

With reference to FIG. 1e, another embodiment of an AD2CP 128 will be described. FIG. 1e illustrates the AD2CP 128 moored near the ocean surface on a cable with beams 130 looking down to observe circulation currents over the water column and beams 132 looking up to observe surface waves 136. In another embodiment, the AD2CP 128 includes a vertical beam 134 to measure the water level directly above the AD2CP 128. In an implementation of the AD2CP 128, the down-looking beams 130 observe circulation currents and/or provide measurements that improve the observation of the wave data. In an implementation of the AD2CP 128, the up-looking beams 132 are used to study upper layer currents with different scales compared with the deeper circulation currents.

In a further implementation of the AD2CP 128, the single AD2CP 128 studies all four processes, all at the same time. In sub-implementation, the AD2CP 128 implements one profiling catenation for mixed layer currents looking up, a second profiling catenation for the circulation currents looking down, a third profiling catenation for surface wave observation looking up, and a fourth profiling catenation to monitor the AD2CP's wave-frequency motion relative to the water column looking down. In this case, it would use two sets of transducers to produce four beam sets, all of which operate contemporaneously.

In another embodiment, which demonstrates the versatility of the AD2CP 128, the AD2CP 128 is turned upside down to make the measurements described with respect to FIG. 1d.

Figure 1G:
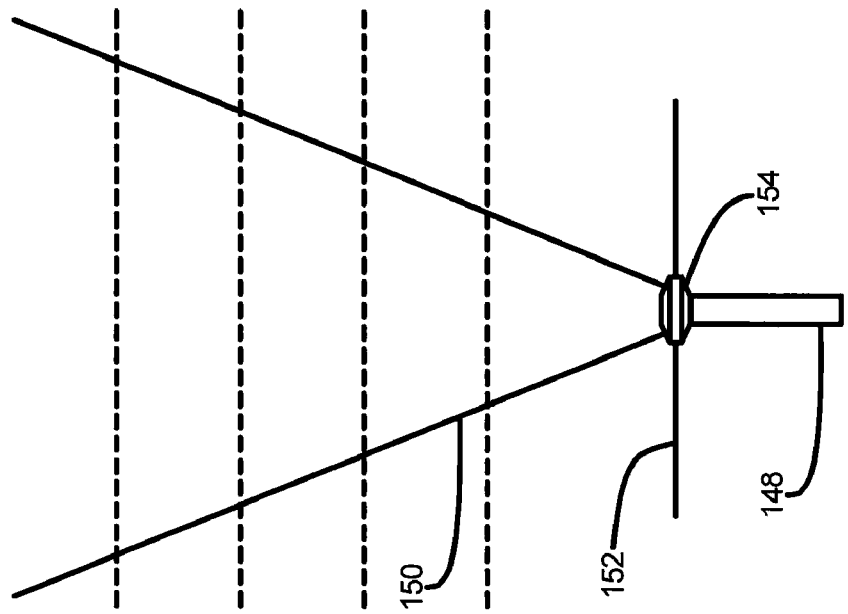
FIG. 1g is a schematic of an AD2CP constructed in accordance with a still further embodiment of the invention, and shows the AD2CP in a body of water.
Figure 1F:
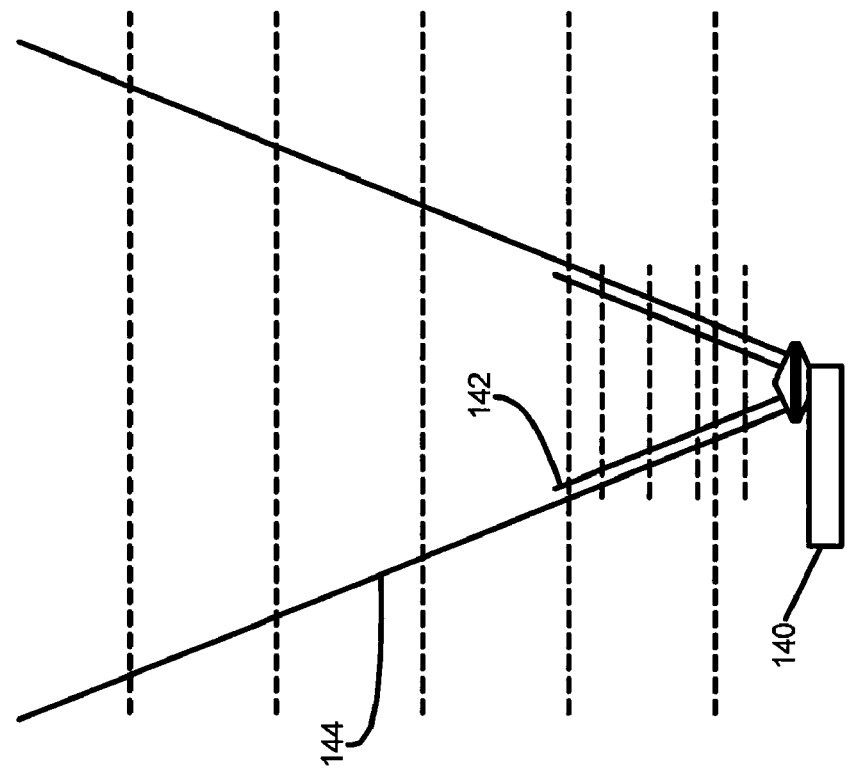
FIG. 1f is a schematic of an AD2CP constructed in accordance with a further embodiment of the invention, and shows the AD2CP in a body of water.

With reference to FIG. 1f, a further embodiment of an AD2CP 140 will be described. FIG. 1f shows the AD2CP 140 mounted on the ocean bottom with two sets of beams 142, 144. Beam set 142 could be a high frequency beam set while beam set 144 is a low frequency beam set. The high frequency beams 142 observe the bottom boundary layer while the low frequency beams 144 profile further into the water column to see a coastal current. In an implementation of the AD2CP 140, the bottom boundary layer observations use smaller cell sizes and shorter measurement intervals. Alternatively, similar results could be obtained when all the beam sets use the same frequency. In the embodiment shown, the AD2CP 140 is illustrated with a horizontal pressure case, which allows the instrument to be mounted closer to the bottom of the body of water.

In an alternative embodiment, the AD2CP 140 includes only one set of transducers, and implements two different profiling catenations with the same transducer set. As a result, the AD2CP 140 produces effectively two beam sets using the single set of transducers. One profiling catenation maximizes the profiling range with high transmit power, a long transmit pulse, and large depth cells. The second profiling catenation uses lower transmit power, a shorter transmit pulse, smaller depth cells and shorter ping intervals to observe the smaller scales characterizing the currents in the boundary layer. In another embodiment, the AD2CP 140 includes a single set of transducers and uses a first profiling catenation to observe both upper layer currents and a second, different profiling catenation to observe surface waves.

With reference to FIG. 1g, another embodiment of an AD2CP 148 will be described. FIG. 1g shows the AD2CP 148 with one set of beams 150 looking up and another set of beams 152 looking horizontally. The horizontal beams 152 provide data that is equivalent to what is produced by a current meter, which is equivalent to a current profiler set to record data in only a single depth cell. The transducer 154 shows both beam sets 150, 152 emanating from a single transducer assembly. In another embodiment, the AD2CP 148 includes two transducer sets separated into two assemblies (a first transducer assembly and a second transducer assembly). For an instrument mounted near the bottom, the horizontal beams provide a measurement inside the bottom boundary layer to supplement data observed over the rest of the water column. An instrument mounted in the middle of the water column could use the horizontal beam to provide supplemental velocity data closer to the AD2CP where data would otherwise be lost. AD2CP 148 could be combined with AD2CP 120 or 128 to enable ADCP 120 or 128 to fill in missing data at the level of the AD2CP, producing a more continuous and uniform profile.

To make the horizontal velocity measurement, the AD2CP 148 divides the horizontal beam into segments that are equivalent to depth cells, using only one segment for its velocity measurement. In another implementation, the AD2CP 148 uses additional segments to make additional velocity measurements. In practice, the horizontal homogeneity of normal ocean currents means that, in most circumstances, there is little value added by recording more than one measurement from the horizontal beams. In alternative embodiments, the AD2CP 148 bypasses the step of breaking the profile into segments before computing horizontal velocity, but the natural attenuation of sound in water would produce the equivalent result of breaking the measurement into segments.

ADCPs with slanted beams are unable to measure data at the depth of the ADCP. AD2CP 148 has the advantage that it is able to fill in the missing data at the depth of the AD2CP. In alternative embodiments, AD2CP 148 could further include beams that look down from the AD2CP and use the horizontal beams to fill in data between the upward-looking profile and the downward-looking profile.

Figure 1H:
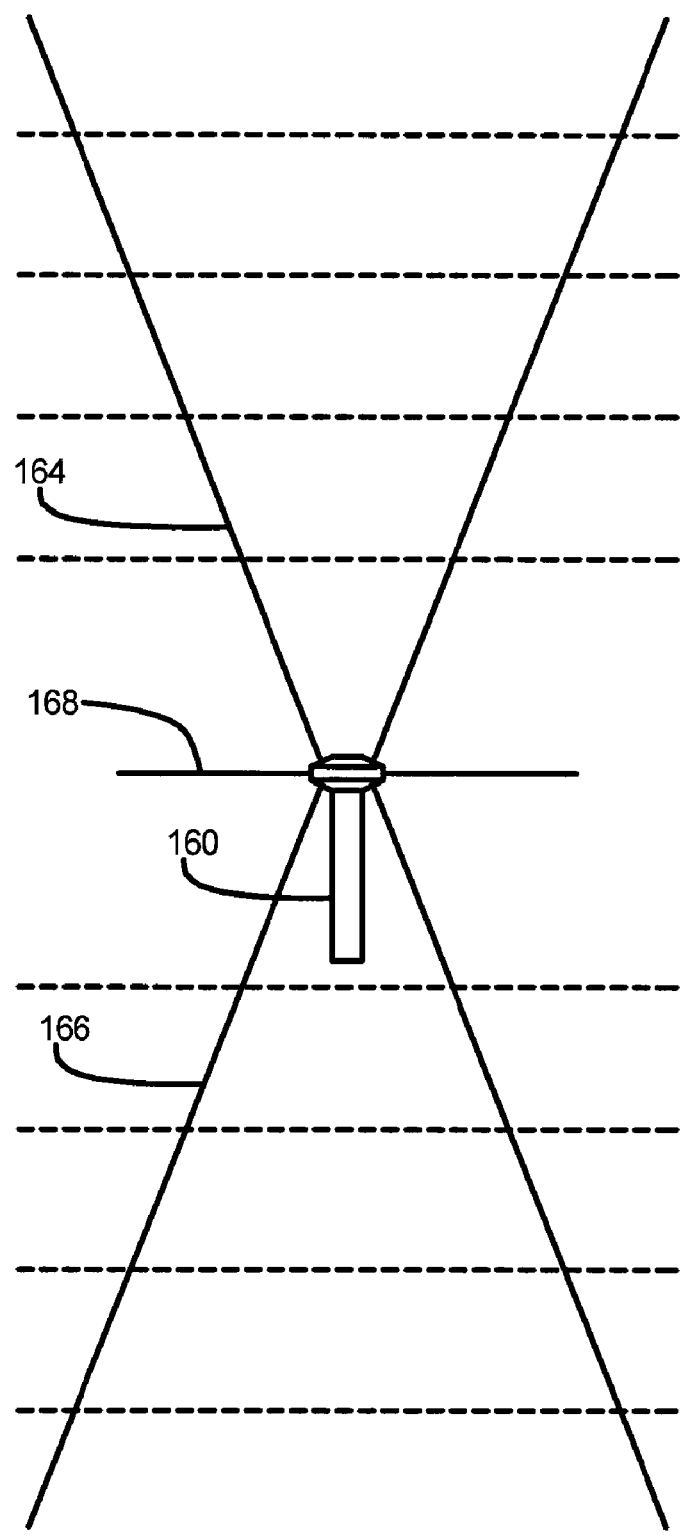
FIG. 1h is a schematic of an AD2CP constructed in accordance with a still further embodiment of the invention, and shows the AD2CP in a body of water.

With reference to FIG. 1*h*, another embodiment of the AD2CP 160 will be described. FIG. 1*h* shows AD2CP deployed both below the surface and above the bottom in the middle of the water column with two sets of slanted beams, 164 facing up, and 166 facing down. The advantage of this configuration is that it enables an AD2CP to double its profiling range without having to go to a lower frequency. Transducer costs increase rapidly at lower frequencies, and ADCPs running at lower frequencies also tend to incur higher costs associated with higher transmit power. Compared with a lower frequency ADCP, the costs of the additional transducers and additional electronic complexity in AD2CP 160 could be more than offset by the savings resulting from the smaller higher frequency transducers, all integrated into a single package and using a single electronics. AD2CP 160 could have further advantages that its battery packs last longer and the overall weight could be less. AD2CP 160, as described thus far, could be valuable for general oceanographic applications even if its profiling catenations were constrained to be the same for both beam sets 164 and 166.

AD2CP 160, as described thus far, would miss data in a range around the depth of the AD2CP. That is not a problem for some applications, but it could be important for others. The addition of horizontal beams 168 solves that problem by filling in data in the gap. AD2CP 160 with beam sets 164, 166 and 168 is just one example of an AD2CP that benefits from having three or more beam sets.

FIGS. 1*d*-1*h* and corresponding description set forth above are just a few examples, embodiments, and implementations of how the AD2CP is constructed and used. All of these examples involve observation of more than one process, each process with its own characteristic time and length scales. In each case, the AD2CP is able to optimize its data collection for each process with the use of a profiling catenation specific to that process.

These examples all use variations in which the AD2CP is attached to the bottom, either moored to the bottom with a cable or mounted above the bottom in frames. The AD2CP is ideally suited for attached applications because there are so many sites to deploy moored or mounted instruments where they can observe multiple processes. However, in alternative embodiments the AD2CP is used as a shipboard AD2CP, which surveys both upper layer currents and deep currents at the same time, each with its own profiling catenation. An AD2CP could also be mounted on a surface buoy, either tethered in place or free to drift around the ocean, or on a subsurface buoy free to drift around the ocean.

Further, an AD2CP is particularly well suited for oceans, given the wide variety of physical processes studied in the oceans. However, in alternative embodiments, the AD2CP is used in other water environments such as, but not limited to, lakes and estuaries.

The AD2CP represents a substantial improvement in the field of oceanographic observation. Its most important advantage is that it enables direct observation of more than one physical process at the same time. These processes typically have different velocity, time and length scales, and they sometimes occupy different volumes of water. Older instruments can be optimized to look at one process at a time, which means that observation of more than one process requires compromises that degrade the results. In many cases, a second process is inaccessible to an instrument observing another process. An AD2CP implements a new approach for oceanographic observation that enables the instrument to observe more than one process at a time, while separately optimizing each observation. An AD2CP also represents a substantial improvement over simply deploying two instruments because the recorded results use exactly the same time base, that is, the data, when recorded, are tagged with times that originate from the same master clock. Because of this, the recorded results are precisely synchronized relative to one another. Without this intrinsic synchronization, investigators require complex and often insecure implementations to synchronize multiple instruments, or difficult, expensive and sometimes problematic post processing to derive synchronized results. The AD2CP is a valuable addition to the tools available to oceanographers and ocean engineers, who are increasingly studying the relationships of different ocean processes.

Figure 2:
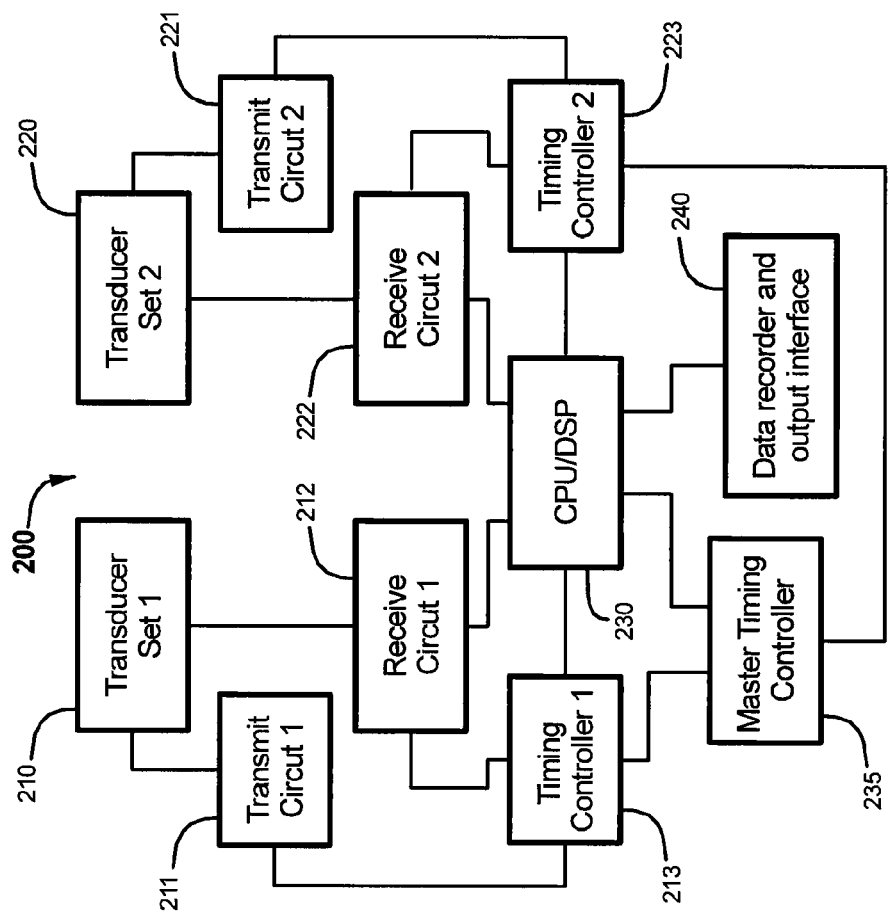
FIG. 2 is a block diagram of an embodiment of an AD2CP showing the major subsystems of the AD2CP.

With reference to FIG. 2, an embodiment of an AD2CP 200 and its basic components will be described. FIG. 2 is a block diagram showing the major subsystems making up the AD2CP 200. In this embodiment, the AD2CP 200 contains two transducer sets/assemblies (first transducer set/assembly 210, second transducer set/assembly 220), each transducer set 210, 220 having multiple transducers. Although two transducer sets 210, 220 are shown and described, in alternative embodiments, the AD2CP includes other numbers (e.g., 1, 3, 4, 5, etc.) of transducers sets having one or more transducers. The first transducer set 210 has a signal and control path that includes transmit circuitry 211, receive circuitry 212, and a timing controller 213. In alternative embodiments, the modules are divided into circuits corresponding 1:1 to each transducer, or the transducers share circuitry through multiplexing. For example, in an implementation of the AD2CP, each transducer includes at least some receive circuitry that is dedicated to that transducer, while all of the transducers from a transducer set share a common transmit circuit and a single timing controller. Transducer set 220 has a its own transmit circuit 221, receive circuit 222 and timing controller 223, which are similar to the corresponding components 211-214 described above, but which run independently. In another implementation of the invention, where the AD2CP uses different frequencies, separate transmit circuits are used for its two transducer sets 210, 220. In a further implementation, where the AD2CP uses the same frequency for both transducer sets, one transmit circuit is used for both sets 210, 220.

The signals feed into CPU/DSP module 230, which then breaks the signal into depth cells and computes velocity in each of the cells. In an embodiment of the AD2CP 200, the CPU/DSP module 230 uses a variety of implementations including, but not limited to, microprocessors, digital signal processors and field programmable gate arrays (FPGAs). In another embodiment of the AD2CP 200, the AD2CP 200 performs velocity computation in parallel, that is, the instrument has a separate velocity processor corresponding to each beam. In a further embodiment of the AD2CP 200, the AD2CP 200 uses a single processor and uses multiplexing or time-sharing to compute velocity.

Each profiling catenation includes its own timing process to implement its particular profile. Timing controllers 213 and 223 set the transmit pulse size, the depth cell size and the profiling range. Master timing controller 235 provides a master clock, controls the timing of individual pings and of measurement intervals, and controls the relative timing of the different profiling catenations operating with the different transducer sets. In one or more embodiments of the AD2CP 200, these timing functions, although identifiably different, are combined on a single circuit board, or coded together into a single FPGA. The two controllers 213 and 223, once triggered, run independently of other channels. The master controller 235 controls signal traffic, by sequencing the two timing controllers and the CPU/DSP 230, keeping the different channels running in the correct sequence relative to one another.

The CPU/DSP 230 also accumulates interim results from the many pings required to compute a velocity recorder. When the time comes to complete a velocity profile, it computes an average profile, tags it with the time, formats it, and transfers the data to the data recorder and output interface 240. Autonomous instruments record data internally, other instruments transfer the data from the output interface to an external device, and some do both. Since the CPU 230 handles the formatting for all the observed data, the time tags all get tagged with times that originate with the master clock.

Figure 3:
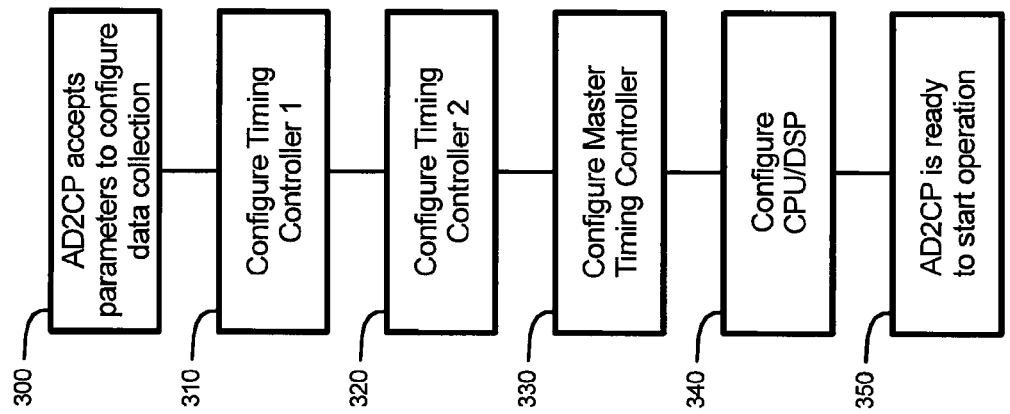
FIG. 3 is a flow chart of an exemplary process through which an AD2CP prepares for deployment.

With reference to FIG. 3, an exemplary process through which an AD2CP prepares for deployment will be described. The process begins, at step 300, when the AD2CP accepts the parameters it will use for the deployment. In some embodiments of the AD2CP, the AD2CP will accept parameters that make sense to a user, for example, but not by way of limitation, depth cell size and number of cells. In other embodiments of the AD2CP, the AD2CP will use external software programs, which convert user parameters into the coding the AD2CP uses internally. If the AD2CP accepts user parameters, it performs this conversion internally. The AD2CP then, at respective steps 310, 320, 330, 340, transfers this coding to each of the timing controllers, to the master timing controller, and to the CPU/DSP. Once each module has its coding in place, at step 350, the AD2CP is ready to start collecting data 350. In alternative embodiments, the above-described exemplary process may vary.

The AD2CP includes appropriate external software or internal coding to coordinate these multiple timing modules to prevent conflicts within the instrument.

Figure 4:
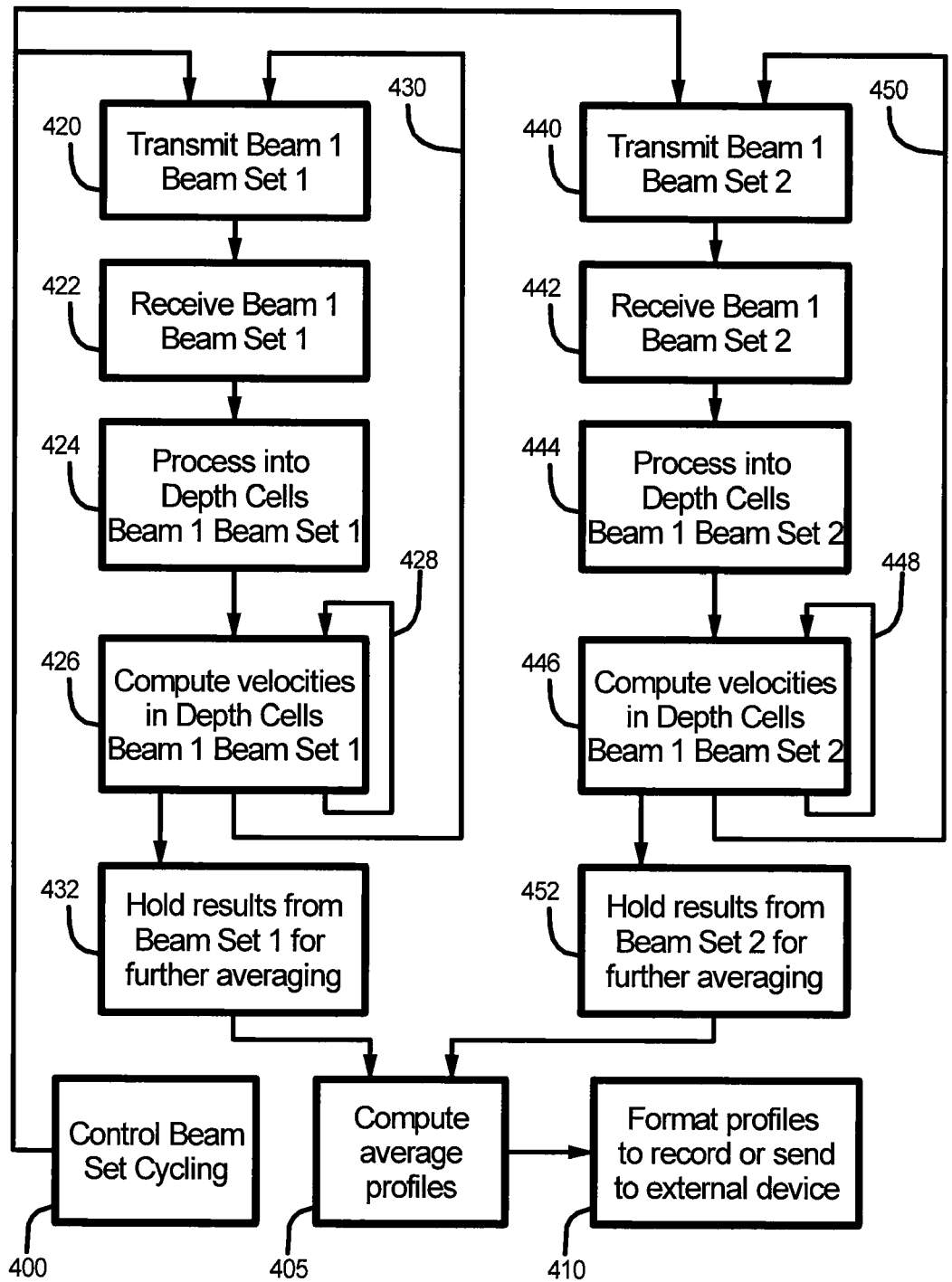
FIG. 4 is a flow chart of an exemplary method of using the AD2CP.

With reference to FIG. 4, an exemplary method of AD2CP operation will be described. The sequence consists of repeating ping cycles. Each cycle starts with a trigger, which at step 400 initiates a ping sequence for one of the beam sets. An exemplary cycle includes, at step 420, transmitting pulse(s) for the first beam of a beam set. The echoes are then received at step 422, processed into depth cells at step 424, and velocities are computed in each depth cell at step 426. Velocity computation is looped at 428, which includes a repeat of the velocity computation until all of the velocities are computed. In an alternative embodiment, the AD2CP performs both depth cell and velocity processing (steps 424, 426) inside the same loop 428. In another embodiment, steps 424 and 426 could occur concurrently with step 422. After the velocity measurements are obtained for all depth cells, the AD2CP loops at 430 to repeat the cycle for the second beam of beam set 1, and continues until all of the beams in beam set 1 have had their turn. In an alternative embodiment, the AD2CP performs this processing in parallel, so that each step 420-426 runs simultaneously for all of the beams in beam set 1. After velocity is computed for all of the beams in a beam set, the AD2CP holds the result for further averaging. The AD2CP is now ready to start a new cycle. In alternative embodiments, the above-described exemplary process may vary.

A cycle for beam set 2, which is set forth in steps 440-452, has the same sequence as the cycle for beam set 1 set forth in steps 420-432, and, therefore, will not be set forth in further detail. If an AD2CP has more than two beam sets, each will have its own sequence of steps equivalent to steps 420-432. The AD2CP alternates the cycles among the beam sets as required for each beam set's catenation. In an implementation of the AD2CP, the AD2CP runs several cycles for one beam set for each cycle of another beam set. In another implementation of the AD2CP, the AD2CP has the capability to collect data simultaneously from multiple beams sets. After a selected number of cycles have been completed for each beam set, the AD2CP computes an average profile 405 for that beam set, then formats the result 410 for transfer to an internal recorder and/or an external device. In further implementations of the AD2CP, the selected number of cycles required for different beam sets is the same or is different. In still further implementations of the AD2CP, the time interval between average profiles varies from one beam set to another.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. An AD2CP, comprising:
   at least one transducer assembly emitting a first set of slanted directional acoustic beams and receiving echoes, and emitting a second set of slanted directional acoustic beams and receiving echoes; and
   electronics that:
      processes the echoes into depth cells and computes velocity in each depth cell;
      includes a first profiling catenation comprising parameters that control the emitting, the receiving, and the processing of the first beam set; and
      includes a second profiling catenation, different from the first profiling catenation, comprising parameters that control the emitting, the receiving, and the processing of the second beam set;
   wherein the electronics contemporaneously coordinates the emitting, the receiving, and the processing.

2. The AD2CP of claim 1, wherein the at least one transducer assembly is configured to emit two or more beam sets.

3. The AD2CP of claim 2, wherein the AD2CP is configured so that at least two of the two or more beam sets use the same slant angle.

4. The AD2CP of claim 1, wherein each transducer assembly is configured to emit one beam set.

5. The AD2CP of claim 4, wherein the AD2CP is configured so that one beam set uses a different acoustic frequency than another beam set.

6. The AD2CP of claim 1, wherein the at least one transducer assembly is configured to emit at least three beam sets.

7. The AD2CP of claim 1, wherein the at least one transducer assembly is configured to emit a vertical beam.

8. The AD2CP of claim 1, wherein the AD2CP is configured so that computed velocity from one beam set is recorded with a different time interval than computed velocity from another beam set.

9. The AD2CP of claim 1, wherein the AD2CP is configured so that one profiling catenation of a beam set uses a different mode of operation than another profiling catenation of another beam set.

10. The AD2CP of claim 1, wherein computed velocities are collected using different beam sets, and different beams sets are all formatted using the same time base.

11. The AD2CP of claim 1, wherein the AD2CP is configured to be attached to a bottom beneath a body of water.

12. The AD2CP of claim 1, wherein the AD2CP is configured to be deployed near a bottom of an ocean, and the AD2CP is configured so that one beam set measures ocean currents over a long profiling range and a second beam set measures bottom boundary layer flow over a short profiling range.

13. An AD2CP, comprising:
a first piston transducer assembly emitting a first set of slanted directional acoustic beams and receiving the echoes;
a second piston transducer assembly emitting a second set of slanted directional acoustic beams and receiving the echoes;
electronics that:
processes the echoes into depth cells and computes velocity in each depth cell;
includes a first profiling catenation comprising parameters that control the emitting, the receiving, and the processing of the first beam set; and
includes a second profiling catenation, different from the first profiling catenation, comprising parameters that control the emitting, the receiving, and the processing of the second beam set;
wherein the electronics contemporaneously coordinates the emitting, the receiving, and the processing.

14. The AD2CP of claim 13, wherein the AD2CP is configured so that one beam set faces upward and the other beam set faces downward.

15. The AD2CP of claim 14, wherein the AD2CP is configured to emit a horizontal beam set.

16. The AD2CP of claim 13, wherein the transducer assemblies include transducers that use the same frequency.

17. The AD2CP of claim 13, wherein the AD2CP is configured so that each beam set has a different profiling catenation.

18. The AD2CP of claim 13, wherein all transducer assemblies are combined together to form a single rigid assembly.

19. The AD2CP of claim 13, wherein the first transducer assembly is free to move relative to the second transducer assembly.

20. An AD2CP, comprising:
a first transducer assembly facing upward and emitting an upward set of slanted directional acoustic beams and receiving the echoes;
a second transducer assembly facing downward and emitting a downward set of slanted directional acoustic beams and receiving the echoes; and
electronics that:
processes the echoes into depth cells and computes velocity in each depth cell;
includes a first profiling catenation comprising parameters that control the emitting, the receiving, and the processing of the upward beam set; and
includes a second profiling catenation, different from the first profiling catenation, comprising parameters that control the emitting, the receiving, and the processing of the downward beam set;
wherein the electronics contemporaneously coordinates the emitting, the receiving, and the processing.

21. The AD2CP of claim 20, further including at least one additional transducer assembly.

22. The AD2CP of claim 20, wherein the AD2CP is configured to emit a vertical beam.

23. The AD2CP of claim 22, wherein the AD2CP is configured to use the vertical beam to measure the distance to an ocean surface.

24. The AD2CP of claim 20, wherein the first, upward-facing transducer assembly uses a different frequency than the second, downward-facing transducer assembly.

25. The AD2CP of claim 20, wherein the AD2CP is configured to be deployed below the ocean surface and use one beam set to observe near-surface flow and a second beam set to observe deeper currents.

26. The AD2CP of claim 20, wherein the AD2CP is configured to be deployed below the ocean surface and use one beam set to observe surface waves and a second beam set to measure the motion of the AD2CP relative to deeper water.

27. An AD2CP, comprising:
a first transducer assembly emitting a first set of slanted directional acoustic beams and receiving the echoes,
a second transducer assembly emitting a second set of horizontal directional acoustic beams and receiving the echoes; and
electronics that:
processes the echoes into depth cells and computes velocity in each depth cell,
includes a first profiling catenation comprising parameters that control the emitting, the receiving, and the processing of the first beam set; and
includes a second profiling catenation, different from the first profiling catenation, comprising parameters that control the emitting, the receiving, and the processing of the second beam set;
wherein the electronics contemporaneously coordinates the emitting, the receiving, and the processing.

28. The AD2CP of claim 27, wherein the first transducer assembly is upward-facing so that the slanted beams face upwards.

29. The AD2CP of claim 28, further including a third transducer assembly configured to emit a third set of slanted directional acoustic beams directed downwards and receive the echoes.

30. The AD2CP of claim 27, wherein the first transducer assembly is downward-facing so that the slanted beams face downwards.

31. The AD2CP of claim 27, wherein the AD2CP is configured so that horizontal beams produce one horizontal velocity measurement.

32. The AD2CP of claim 27, wherein the AD2CP is configured so that horizontal beams provide velocity data to fill in missing velocity measurements at the depth of the AD2CP.

* * * * *